United States Patent Office 3,137,583
Patented June 16, 1964

3,137,583
CORROSION RESISTANT PAINTS
Loren A. Bryan, Morton Grove, Ill., and William A. Tidridge, Fanwood, N.J., assignors to FMC Corporation, New York, N.Y., a corporation of Delaware
No Drawing. Filed Aug. 8, 1961, Ser. No. 129,958
10 Claims. (Cl. 106—14)

The present invention is concerned with the prevention of corrosion of ferrous metals by the application of a corrosion resistant paint to the surface of the metals.

An effective anti-corrosion, exterior paint has long been desired which could be applied to a metal surface without the necessity of applying a special corrosion resistant primer coat between the paint and the metal surface. Such a paint has great utility in industrial finishes, where corrosion constitutes a serious problem. Additionally, it would have great utility for home consumption where it is desirable to apply anticorrosion coatings to gutters, nail heads, etc., in one simple painting operation.

The presently available direct application paints which have developed generally depend for their anti-corrosion properties upon special pigments which are included in the paint formulation in amounts of at least 10% by weight. These pigments, e.g., red lead, zinc chromate, lead chromate, etc., act as anodic inhibitors against corrosion. In the case of the chromate compounds, it is believed that these protect the metal surface by depositing a chromate layer on the metal surface. The accompanying cations such as zinc or lead are not believed to play a part in the anti-corrosion action. The low solubility of these chromate salts are believed to supply a reserve of chromate ions against weathering and leaching of the paint film. Red lead is believed to act by anodic oxidation of FeO to $Fe_2O_3$, and possibly by the anodic adsorption of soluble lead compounds. The inclusion of such large quantities of special pigment, i.e., upwards of 10% by weight, is undesirable because it constitutes an additional expense, and because large quantities of such an additive detrimentally affect the physical properties of the paint finish. More specifically, lead reacts with long-chained fatty acids and with dicarboxylic acids such as phthalic acid causing loss of adhesion and increased brittleness of the paint film. As a result, the acid vehicles employed with lead must have low acid numbers in order to prevent livering. Heretofore, the substitution of inexpensive fillers for these anti-corrosion pigments has not been successful without decreasing the corrosion resistance of the paint.

It is an object of the present invention to provide a method, and composition, for increasing the corrosion inhibition of paints, when applied without an anti-corrosion primer between the paint and a metal surface, by the inclusion of novel corrosion resistant compounds in the paint formulations.

These and other objects will be obvious from the following disclosure.

It has now been found that paints which contain either an air-drying oil base, an alkyd resin base, an epoxy base, or a polyvinyl acetate base, surprisingly impart improved corrosion-resistance when applied to metals if these paints contain about 0.5% to 1% by weight of a barium compound which is either a barium cyanurate, a barium (2-ethyl hexyl) phosphate, barium caprate, barium caprylate or barium phytate. The improved corrosion resistance of the paint is obtained in the absence of anodic, corrosion-resistant type pigment additives, and without otherwise affecting the other desirable properties of the paint.

The addition of the above specified barium salts to the paints also increases the adhesion of these paints to base surfaces. This improvement in adhesion has been found to be quite sizable when either a barium cyanurate or barium phytate is added to the polyvinyl acetate base paints.

The present corrosion-resistant paint formulation can be applied directly to the bare metal, or they can be applied over an adhesion promoting primer. While the preferable manner of application is the direct coating of the metal surface, many industrial applications require a strong bond of the paint to the metal. This is generally achieved only by employing an adhesion promoting primer, such as an epoxy based primer, to adhere the paint to the metal surface. Primers of this type do not contain any pigments or other additives which are designed to give added corrosion resistance, and are readily distinguishable from the anti-corrosion primers which contain large quantities of lead, chromate salts, or other anti-corrosion pigments. The barium salt is employed most desirably in amounts of about 1% by weight, although smaller amounts on the order of 0.5% by weight are effective.

The base for the instant paint formulations can be any of four specific types. The first of these is the air-drying oil type. The most prominent air-drying oil employed is linseed oil, primarily because of its good drying properties and low cost. However, other suitable air-drying oils such as soybean oil, tung oil, dehydrated castor oil, China-wood oil, oiticica oil, perilla oil and others can be employed. A typical formulation of this air-drying oil base paint is given below in Formula I which meets the requirements of Federal Specification TTP–103 for an exterior fume resistant ready-mixed exterior white paint.

FORMULA I

*Linseed Oil Outside White Paint* [1]

| Ingredient: | Lb./gal. |
|---|---|
| Titanium oxide, anatase [2] | 1.53 |
| Zinc oxide [3] | 3.06 |
| Magnesium silicate [4] | 3.46 |
| Raw linseed oil | 2.82 |
| Heavy bodied linseed oil | 1.47 |
| 6% Mn naphthenate | .021 |
| 4% Ca naphthenate | .160 |
| Mineral spirits [5] | 1.13 |

[1] Federal Specification TTP–103 lead free.
[2] Commercially available as Ti Pure–FF.
[3] Commercially available as XX–601.
[4] Commercially available as Talc No. 13.
[5] An aliphatic hydrocarbon solvent. B.P. 313–386° F.

A second type of paint which can be employed is one wherein an alkyd resin is the base ingredient in the formulation. The dicarboxylic acid employed in the alkyd resin may be maleic, fumaric, sebacic, adipic, phthalic, isophthalic, terephthalic or their anhydrides. The alcohol which is reacted with the dicarboxylic moiety is preferably a polyhydric alcohol such as glycerine, pentaerythritol, propylene glycol and the like. A typical formulation for this paint is given in Formula II.

FORMULA II

Alkyd-Based Outside Flat White Paint

| Ingredient: | Lb./gal. |
|---|---|
| Titanium oxide, anatase [1] | 0.75 |
| Titanium oxide, rutile [2] | 0.75 |
| Wet ground mica | 0.50 |
| Calcium carbonate | 5.00 |
| Alkyd resin (50NV) [3] | 3.45 |
| Thixcin [4] | 0.04 |
| 24% Pb naphthenate | 0.020 |
| 6% Co naphthenate | 0.010 |
| Mineral spirits [5] | 1.64 |

[1] Commercially available as Ti Pure FF.
[2] Commercially available as Ti Pure R-610.
[3] The alkyd resin employed was made up from a mixture of 50% soybean oil, 35% phthalic anhydride and 18% glycerine by the following procedure. Fifty parts of soybean oil, and 18 parts of glycerine were mixed together and 1½% of litharge was added. The mixture was heated at 200 to 225° C. until a sample of the mixture could be diluted with methanol (1 part mixture to 8 parts methanol) without turbidity or precipitation. The mixture was then cooled to about 150° C., and 35 parts of phthalic anhydride was added. The mixture was subject to dehydration by azeotropic distillation with 6% added xylene as the entrainer, at a temperature of about 250° C. The water-xylene azeotrope coming off overhead was condensed into two immiscible layers. The xylene layer was returned to the distillation column, while the water was discarded. The mixture was maintained at 250° C. and water was continuously removed, until a sample of the resin in the base of the column had an acid number of 10 and a viscosity of about 5 to 9 poises, when it was diluted with mineral spirits to give a 50% non-volatile mixture. The resulting resin was cooled and diluted with 100 parts of mineral spirits to give a 50% non-volatile mixture.
[4] A vegetable oil base embodying agent derived from castor oil.
[5] An aliphatic hydrocarbon solvent. B.P. 313–386° F.

A third type of paint which can be employed is one having a polyvinyl acetate base. The polyvinyl acetate is present in the aqueous paint formulation in the form of an emulsion. Polyvinyl acetate based water paints dry in a different manner than formulations containing other vehicles. When the formulation is applied to a surface and the water evaporates, the individual polyvinyl acetate particles coalesce into a film. However, no additional crosslinking or chemical reaction takes place between the individual polyvinyl acetate particles as is the case with paints containing air-drying oils, alkyl resins or epoxy resins. Thus, the resultant polyvinyl acetate film is desirable as an exterior coat because it weathers well. A typical formulation for a polyvinyl acetate exterior white paint is given in the Technical Services Bulletin, Shawinigan Resins Corporation, October 1957. This formulation is given in Formula III below.

FORMULA III

Polyvinyl Acetate Exterior White Paint [1]

| Ingredient: | Lb./gal. |
|---|---|
| Titanium oxide, rutile [2] | 2.394 |
| Calcium silicate [3] | .426 |
| Mica [4] | .213 |
| Polyvinyl actate emulsion (55NV) [5] | 3.511 |
| Methocel 1500 cps. 3% aqueous [6] | .851 |
| Dibutyl phthalate | .255 |
| Ethylene glycol | .213 |
| Tamol 731, 10% aqueous [7] | .149 |
| Hexylene glycol | .160 |
| Water | 2.734 |

[1] Gelva Emulsion Paint 3351. Technical Service Bulletin, Shawinigan Resins Corporation, October 1957.
[2] Commercially available as Ti Pure R-160.
[3] Commercially available as Wollastonite P-1.
[4] Commercially available as Mineralite 3X.
[5] The 55% non-volatile polyvinyl acetate emulsion was prepared by mixing together 45 grams of water, 1% Triton X-200 (a 28% alkylaryl sulfonate emulsifier in aqueous solution) and 1% of a low viscosity polyvinyl alcohol in a flask equipped with a reflux condenser. To this mixture was added a half-gram of ammonium persulfate and 5 parts of vinyl acetate. The mixture was heated to a temperature of about 90° C. The balance of the vinyl acetate (50 parts) was added while refluxing over a period of several hours. The resulting emulsion contained 55% non-volatile material and had a viscosity of about 1200–1400 cps.
[6] An aqueous solution of methyl cellulose with a viscosity of 4,000 cps.
[7] A sodium salt of a high molecular weight polycarboxylic acid in a 10% aqueous solution.

A fourth type of paint formulation which can be employed is one having an epoxy resin base. The epoxy ester resins are dissolved in an organic solvent medium such as ketones and aromatic hydrocarbons and polymerize, upon drying, through reactive groups such as olefinic linkages. Polymerization of epoxy resins can also take place through a plurality of reactive amide groups attached to the epoxy base. The polymerization may be carried out in the presence of a metal catalyst such as an organic cobalt salt. A typical epoxy ester formulation is given in Formula IV below.

FORMULA IV

Composition of Epoxy Paints

| Ingredient: | Parts by weight |
|---|---|
| $TiO_2$ [1] | 144 |
| Clay [2] | 188 |
| Aluminum stearate [3] | 131 |
| Anti-flooding agent | 1.00 |
| Soya lecithin [4] | 3.50 |
| Epoxy esters [5] | 408.0 |
| Xylene | 92.25 |
| VM & P naphtha | 90.50 |
| 6% cobalt naphthenate | 2.24 |
| 6% zirconium catalyst | 8.50 |
| Anti-oxidant [6] | 1.00 |

[1] Commercially available as non-chalking grade R-610.
[2] Commercially available as ASP-100.
[3] Commercially available as Distearate No. 18.
[4] Commercially available as Yelkin TTS.
[5] The resin employed was prepared by heating 46.8 parts of a bis-phenol epichlorohydrin condensate (having an epoxy equivalent of about 870 to 1025) with 53.2 parts of dehydrated castor oil fatty acids at a temperature of about 500° F. for 3 hours. The resulting mixture was cooled and thinned with mineral solvents to give a 50% non-volatile mixture. The acid numbers of the thinned resin samples were between 7 and 11, and they had viscosities of between 10 to 20 poises.
[6] Commercially available as orthophen 278.

FORMULA V

Polyvinyl Actate White Latex Paint

| Ingredient: | Lb./gal. |
|---|---|
| Titanium oxide, rutile [1] | 2.472 |
| Silica [2] | 0.438 |
| Calcium silicate [3] | 0.461 |
| Polyvinyl acetate emulsion (55NV) [4] | 3,000 |
| Tamol 731, 10% aqueous | 0.034 |
| Dibutyl phthalate | 0.247 |
| Hexylene glycol | 0.185 |
| Ethylene glycol | 0.309 |
| Pluronic L-62 | 0.025 |
| Aerosol OT, 75% aqueous | 0.034 |
| Methocel 4000 cps., 2% aqueous | 2.247 |
| Water | 1.657 |

[1] Commercially available as Ti Pure R-610.
[2] Commercially available as Gold Bond R.
[3] Commercially available as Wollastonite P-1.
[4] The 55% non-volatile polyvinyl acetate emulsion was prepared by mixing together 45 grams of water, 1% Triton X-200 (a 28% alkylaryl sulfonate emulsifier in aqueous solution) and 1% of a low viscosity polyvinyl alcohol in a flask equipped with a reflux condenser. To this mixture was added a half-gram of ammonium persulfate and 5 parts of vinyl acetate. The mixture was heated to a temperature of about 90° C. The balance of the vinyl acetate (50 parts) was added while refluxing over a period of several hours. The resulting emulsion contained 55% non-volatile material and had a viscosity of about 1200–1400 cps.

The corrosive resistant property of the five barium salts varies depending upon which formulation is employed. In general, the barium salts of cyanuric acid and barium (2-ethyl hexyl) phosphate appear to be highly advantageous in all of the formulations. The barium cyanurates which can be employed are barium hydrogen cyanurate, barium di-hydrogen cyanurate, barium cyanurate, and mixtures of the above. However, when the polyvinyl acetate based paint (Formula III) is employed, barium phytate appears to be outstanding in its corrosive resistant action. Barium phytate also is excellent when employed with the epoxy resin based paint (Formula IV).

The following examples illustrate the corrosive-resistant action of the specified barium salts and are presented as representative of the present invention but are not intended as limitative thereof.

EXAMPLE 1

The paint formulation found in Formula I, given above, was prepared in the following manner. The raw and heavy bodied linseed oils were weighed into 1-liter beakers. The titanium oxide, zinc oxide and magnesium silicate were added portion-wise with continuous stirring. Stirring was continued for about 10 minutes after the addition was completed. The mixture was then passed through a 3-roll Day Mill until the paste had a fineness of grind of at least 3H.

The designation "H" refers to the Hegman grind gauge which was used in the determination. The method for using this gauge is described by Gordon and Dolgin in "Surface Coatings and Finishes," Chemical Publishing Company, New York (1954). The proper use of this instrument is further reported in an article by Doubleday and Barkman, printed in the "Paint, Oil and Chemical Review (June 22, 1950)."

The pastes were collected in quart cans, weighed and stored for at least 24 hours to allow pigment sweating to be completed. The mineral spirits and driers were added in the amounts set forth in Formula I.

The control formulation used in this example was made up as described above. The experimental formulations were made up exactly as set forth above except that each of the barium salts designated in Table I was added to the formulations in the amounts indicated in Table I. The barium salts were added to the linseed oils during the initial mixing stage until they were thoroughly wetted and dispersed prior to the addition of the metal oxides and the magnesium silicate.

The control formulation and the test formulations containing the various barium salts were tested for their corrosion resistance in a salt-water immersion test as described below. Films of the various salts were prepared by dipping descaled and passivated mild steel strips in the paint formulations and permitting them to air-dry at room temperature for 5 days. The coated strips were then suspended in a 5% aqueous sodium chloride bath. The salt solution was permitted to syphon away slowly into a collection receptacle over a period of about 2 days during which the strips remained exposed to ambient conditions for 1 to 2 days before being inspected. The salt-water was then returned to the bath and the cycle was then repeated. This treatment continued until the corrosion pattern of the panels had developed sufficiently so that differences in corrosion of the panels were consistent. The results of the testing are reported in Table I.

EXAMPLE 2

The paint formulations in Formula II were prepared in the following manner. The prepared alkyd resin and Thixcin were weighed into 1-liter beakers. The titanium oxides, mica and calcium carbonate were added portion-wise with continued stirring. Stirring was also continued for about 10 minutes after the addition was completed. The mixture was then passed through a 3-roll Day Mill until the paste had a fineness of grind of at least 3H. The pastes were collected in quart cans, weighed and stored for at least 24 hours. The mineral spirits and driers were added in the amounts set forth in Formula II.

The control formulations used in this example were made up as described above. The experimental formulations were made up exactly as set forth above except that each of the barium salts designated in Table I were added to the formulas in amounts reported in Table I. The barium salts were added to the mixture of the alkyd resin and Thixcin during the initial mixing step until they were wetted and dispersed prior to the addition of the metal oxides and magnesium silicate.

These formulations were subjected to the salt-water immersion test as set forth in Example 1. The results of corrosion are given in Table I.

EXAMPLE 3

The paint formulation found in Formula III, given above, was prepared in the following manner. The polyvinyl acetate exterior white paint was prepared by making up two separate mixtures, a "Paint Base" and a "Pigment Slurry." The "Pigment Slurry" was made up by combining the water and Tamol into 1-liter beakers. The titanium oxide, calcium silicate and mica were added portion-wise to the beaker with stirring until a smooth, lump-free mixture was obtained. Simultaneously, a "Paint Base" was made up by adding dibutyl phthalate, ethylene glycol and hexylene glycol with rapid stirring to the prepared polyvinyl acetate emulsion. Stirring was continued for about 30 minutes. The "Pigment Slurry" was passed through a Morehouse Mill. The Methocel solution and "Paint Base" were added to the milled "Pigment Slurry" with moderate stirring, until a smooth mixture was obtained.

The control formulation was made up as described above. The experimental formulations were made up exactly as set forth above except that each of the barium salts designated in Table I was added to the formulations in amounts set forth in Table I. The barium salts were added to the "Pigment Slurry" along with the titanium oxide, calcium silicate and mica during the initial mixing stage. The formulations were then tested by means of the salt-water immersion procedure designated in Example 1. The results of these tests are tabulated in Table I.

EXAMPLE 4

Formula IV, given above, was prepared in the following manner. The epoxy resin solution was mixed with some of the xylene and naphtha solvent, along with the soya lecithin and anti-flooding agent. To this mixture was added portion-wise $TiO_2$, clay and aluminum stearate, with continuous stirring. The mixture was then passed through a 3-roll Day Mill until the paste had a fineness of grind of at least 3H. The mixture was collected in a quart can, weighed, and stored. The balance of the solvent, as well as the cobalt naphthenate, zirconium catalyst, and anti-oxidant were added to the mixture with stirring.

A control formulation was made up as described above. The experimental formulations were made up exactly as set forth above except that each of the barium salts designated in Table II, was added to the formulations in amounts specified in Table II.

Descaled and passive mild steel strips were dipped in an epoxy resin primer solution and permitted to dry at room temperature. The epoxy resin primer solution was prepared by heating 43.5 parts of a bis-phenol epichlorohydrin condensate (having an epoxy equivalent of about 870 to 1025) with 56.5 parts of linseed oil fatty acids at a temperature of about 500° F. for 10 hours. The resulting mixture was cooled and thinned with mineral solvents to give a 50% non-volatile mixture. The acid numbers of samples of the thinned epoxy resin were between 7 and 10, and they had viscosities of between 5 to 8 poises. The primer solution was further diluted with mineral spirits until a workable dipping consistency was reached.

The primer coated strips were then dipped in the paint formulations containing the barium salts and permitted to dry at room temperature for 5 days. The coated strips were then suspended in a 5% aqueous saline bath and tested as set forth in Example 1. The results are reported in Table II.

In a second series of tests, the epoxy resin primer, defined above, was modified by adding 1% of one of the barium salts listed in Table II. A second series of descaled and passive mild steel strips were dipped in the barium treated primer solution and permitted to dry at room temperature. These coated strips were then dipped in the paint formulation specified in Formula IV and permitted to dry at room temperature for 5 days. These coated strips were similarly tested in a salt-water immersion test as described in Example 1. The results are shown in Table II.

*Table I*

CORROSION IN SALT-WATER IMMERSION CYCLE

[4 cycles]

| Barium Salt | Amount Added, percent by wt. | Result, Example 1 | Result, Example 2 | Result, Example 3 |
|---|---|---|---|---|
| None | | 5 | 6 | 2 |
| Barium Caprylate | 1 | 3 | 3 | |
| Barium Caprate | 1 | 5 | 1 | 2 |
| Barium 2-Ethylhexyl Phosphate | 1 | 2 | 2 | |
| Barium Cyanurate | 1 | 1 | 4 | |
| Barium Phytate | 1 | | 6 | 1 |

In each run (1) indicates the best result while increased numbers indicate progressively poorer performance.

*Table II*

CORROSION IN SALT-WATER IMMERSION CYCLE

[16 Cycles]

| Test Strip Treatment | Amount Added, Percent | Control | Caprate | 2-Ethyl-Hexyl Phosphate | Sulfostearate | Cyanurate | Phytate |
|---|---|---|---|---|---|---|---|
| Barium salt in finish coat only; primer coat free of barium salt | 1 | 5 | 1 | 2 | 3 | 4 | |
| Barium salt added to primer alone; exterior epoxy paint free of barium additive | 1 | 6 | 5 | 4 | 2 | 3 | 1 |

In each run (1) indicates the best result while increased numbers indicate progressively poorer performance.

The following example illustrates the increased adhesion obtained when barium phytate and barium cyanurate were employed with a polyvinyl acetate based paint.

EXAMPLE 5

The paint formulations in Formula V, given above, were prepared in the following manner. The polyvinyl acetate white paint was obtained by preparing a mixture of the prepared polyvinyl acetate emulsion, plasticizers and wetting agents into a "Paint Base." Simultaneously, a mixture of water and pigment with thickener and dispersing agents was made up as a "Pigment Slurry." The "Paint Base" was prepared by mixing in the following order and with stirring: the hexylene glycol, ethylene glycol, Pluronic L-62, Aerosol OT, dibutyl phthalate and about 39% of the water required by the formulation. After mixing 5 minutes, the prepared polyvinyl acetate emulsion was added gradually and the entire mixture was stirred for 30 minutes. The "Pigment Slurry" was prepared by adding the remaining 61% of the water required by the formulation in a beaker along with 10% aqueous Tamol 731, 2% aqueous Methocel, titanium oxide, diatomaceous silica and calcium silicate. The additions were made up with constant stirring until the slurry was smooth and free of lumps.

The finished paint was prepared by adding the "Paint Base" to the "Pigment Slurry" with constant stirring. The mixture was stirred until it appeared homogeneous and was then passed through a Day 3-roll mill until a fineness of grind of 5H was obtained.

The control formulation used in this example was made up exactly as described above. The experimental formulations were made up exactly as set forth above except that each of the barium salts designated in Table III was added when the "Paint Base" was added to the "Pigment Slurry."

The formulations were applied to the surface of metal test panels, dried, and were tested for adhesion by means of a Hoffman Scratch-Hardness Tester. This instrument consists of a graduated beam equipped with weights that exert force on a hollow cylindrical scratch tool. These are mounted on a flat carriage with 4 wheels that can be drawn over a flat painted surface. The adhesion test is made by cutting a line all the way through the test film down to the metal substrate. The edge of the scratching tool is placed in the cut and moved at right-angles to the cut. The adhesion is the weight in grams of force on the scratching tool required to cause the film to be moved cleanly from the substrate. Details for the use and maintenance of the instrument are provided in "Instructions for Hoffman Scratch-Hardness Tester," PH 1750A, Gardner Laboratory, Inc. (December 1957). The results of the testing are reported in Table III.

*Table III*

ADHESION OF POLYVINYL ACETATE PAINT

| Ingredient | Wt. percent Added | Adhesion |
|---|---|---|
| None | 0 | 175 |
| Barium Phytate | 1 | 350 |
| Barium Cyanurate | 1 | 500 |

The results of the tests show that the action of the barium salts is not uniform; that is, the degree of corrosion resistance depends upon the specific barium salt which is employed and also depends upon the specific paint formulation in which it is used. For example, barium cyanurate is much more effective in oil based paints described in Example 1 than it is in the alkyd resin based paints described in Example 2. Conversely, barium caprate shows only a marginal improvement in the oil based paints in Example 1, whereas it shows a substantial improvement in the alkyd resin of Example 2. In a similar manner, barium phytate is extremely effective in the polyvinyl acetate based paint formulation described in Example 3, but is only marginally effective in the alkyd resin based paint of Example 2.

The results which are obtained in Table II with the epoxy resins show the same situation. For example, barium caprate is only marginally effective when placed in the primer alone but is very effective when placed in the epoxy finishes alone. Conversely, barium cyanurate is only marginally effective when placed in the epoxy finish alone but is more effective when placed in the epoxy primer alone.

While all of the barium compounds show some beneficial effect, it should be understood that the greatest beneficial effect can be obtained where the combination of the barium salt and the paint formulation is selected to give the highest possible corrosion inhibition. The addition of the barium salt is further advantageous because it improves the adhesion of all the above described paints to base surfaces. In the case of the polyvinyl acetate paints there is a marked improvement when barium cyanurate and barium phytate are added to the formulation as shown by Example 5 and Table III.

Additional ancillary benefits which have been observed with these barium additives are increases in the hardness of both the water-thinned and solvent thinned paints and an increase in the flexibility of the oil based paint films. This increase in hardness is very desirable in applications where paint films are subject to sustained abrasion or impact stresses. Additionally, the increased flexibility of the oil based paints is desirable to reduce the well known property of these paint films to crack upon aging or upon bending of the substrate beneath the paint film.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A method of producing a corrosion-resistant paint having a base selected from the group consisting of an air-drying oil base, an alkyd resin base, an epoxy resin base, and a polyvinyl acetate base which comprises adding to said paint a barium salt in amounts of 0.5% to 1% by weight, selected from the group consisting of barium cyanurates, barium (2-ethylhexyl) phosphate, barium caprate, barium caprylate, and barium phytate.

2. A method of producing a corrosion-resistant paint having a base selected from the group consisting of an air-drying oil base, an alkyd resin base, an epoxy resin base, and a polyvinyl acetate base which comprises adding a barium cyanurate salt to said paint in amounts from 0.5% to 1% by weight.

3. A method of producing a corrosion-resistant paint having a base selected from the group consisting of an air-drying oil base, an alkyd resin base, an epoxy resin base, and a polyvinyl acetate base which comprises adding to said paint barium (2-ethylhexyl) phosphate in amounts of 0.5% to 1% by weight.

4. A method of producing a corrosion-resistant paint having a base selected from the group consisting of an air-drying oil base, an alkyd resin base, an epoxy resin base, and a polyvinyl acetate base which comprises adding to said paint barium caprate in amounts of 0.5% to 1% by weight.

5. A method of producing a corrosion-resistant paint having a base selected from the group consisting of an air-drying oil base, an alkyd resin base, an epoxy resin base, and a polyvinyl acetate base which comprises adding to said paint barium caprylate in amounts of 0.5% to 1% by weight.

6. A method of producing a corrosion-resistant paint having a base selected from the group consisting of an air-drying oil base, an alkyd resin base, an epoxy resin base, and a polyvinyl acetate base which comprises adding to said paint barium phytate in amounts of 0.5% to 1% by weight.

7. A composition of matter comprising a paint having a base selected from the group consisting of an air-drying oil base, an alkyd resin base, an epoxy resin base, and a polyvinyl acetate base, said paint containing a barium salt selected from the group consisting of barium cyanurates, barium (2-ethylhexyl) phosphate, barium caprate, barium caprylate, and barium phytate, said barium salt being present in amounts of 0.5% to 1% by weight.

8. A composition of matter comprising a paint having an epoxy resin base and containing barium sulfostearate in amounts of 0.5% to 1% by weight.

9. A composition of matter comprising a paint having a polyvinyl acetate base and containing a barium cyanurate in amounts of 0.5% to 1% by weight.

10. A composition of matter comprising a paint having a polyvinyl acetate base and containing barium phytate in amounts of 0.5% to 1% by weight.

References Cited in the file of this patent
UNITED STATES PATENTS
2,702,284    Brock _____ Feb. 15, 1955

UNITED STATES PATENT OFFICE
CERTIFICATE OF CORRECTION

Patent No. 3,137,583                      June 16, 1964

Loren A. Bryan et al.

It is hereby certified that error appears in the above numbered patent requiring correction and that the said Letters Patent should read as corrected below.

Column 2, line 12, for "formulation" read -- formulations --; column 3, line 42, for "alkyl" read -- alkyd --; column 4, line 18, for "188" read -- 118 --; line 45, for "3,000" read -- 3.000 --.

Signed and sealed this 3rd day of November 1964.

(SEAL)
Attest:

ERNEST W. SWIDER
Attesting Officer

EDWARD J. BRENNER
Commissioner of Patents